Figure 1:
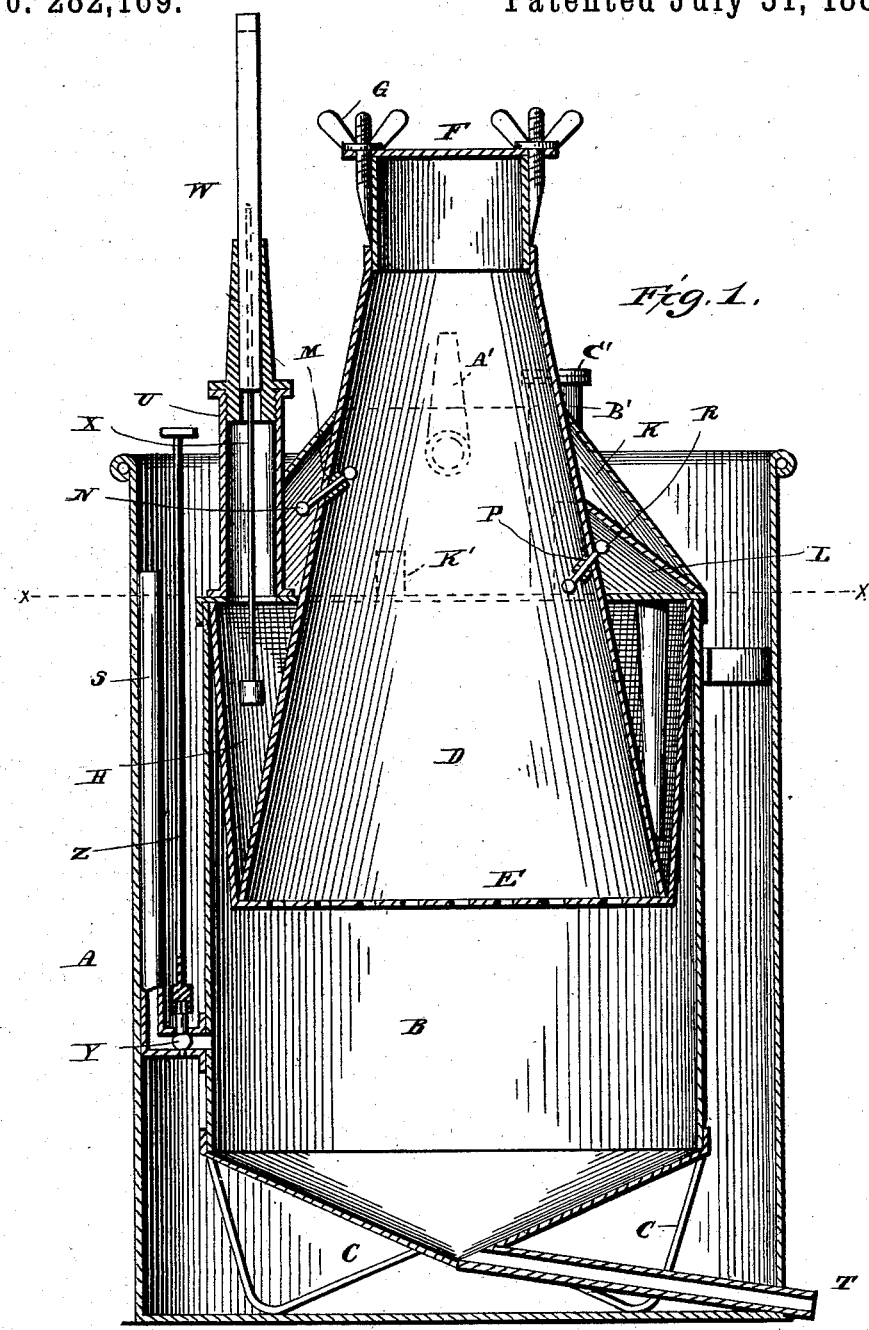

(No Model.) 2 Sheets—Sheet 1.

W. COLLINGS.
APPARATUS FOR GENERATING AND CARBURETING HYDROGEN GAS.

No. 282,169. Patented July 31, 1883.

WITNESSES

INVENTOR
William Collings
By N. W. Fitzgerald & Co
Attorney (No Model.)
W. COLLINGS.
APPARATUS FOR GENERATING AND CARBURETING HYDROGEN GAS.
No. 282,169. Patented July 31, 1883.
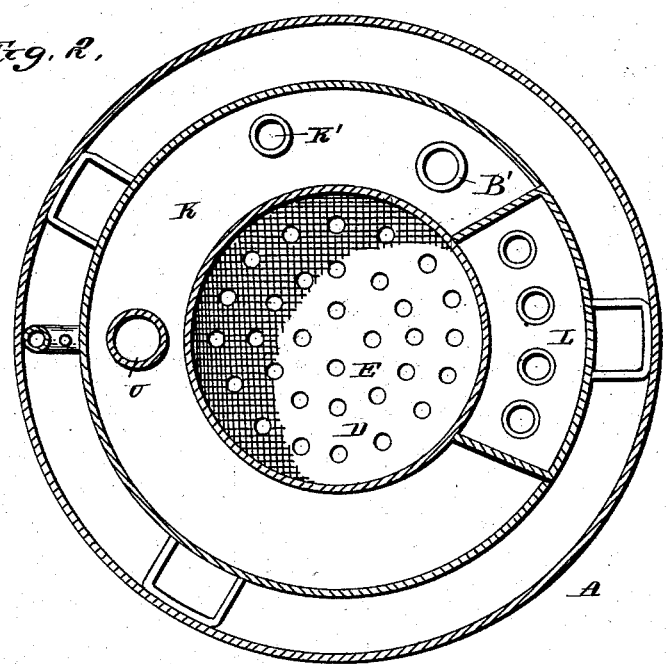
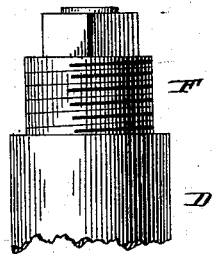
WITNESSES
INVENTOR
William Collings

UNITED STATES PATENT OFFICE.

WILLIAM COLLINGS, OF AFTON, IOWA, ASSIGNOR OF THREE-FOURTHS TO JOSEPH YEAGER, J. W. McCLELLEN, AND JOSHUA KEATING, OF SAME PLACE.

APPARATUS FOR GENERATING AND CARBURETING HYDROGEN GAS.

SPECIFICATION forming part of Letters Patent No. 282,169, dated July 31, 1883.

Application filed June 23, 1883. (No model.)

*To all whom it may concern:*

Be it known that I, WILLIAM COLLINGS, a citizen of the United States, residing at Afton, in the county of Union and State of Iowa, have invented certain new and useful Improvements in Apparatus for Generating and Carbureting Hydrogen Gas for Illuminating Purposes; and I do hereby declare the following to be a full, clear, and exact description of the invention, such as will enable others skilled in the art to which it appertains to make and use the same.

This invention relates to certain improvements in apparatus for generating and carbureting hydrogen gas for illuminating purposes; and it has for its objects to provide an apparatus that will be compact and inexpensive, that may be easily operated, and that will be automatic in its operation after being properly charged, as more fully hereinafter specified. These objects I attain by the means illustrated in the accompanying drawings, in which—

Figure 1 represents a vertical sectional view of my improved apparatus; Fig. 2, a horizontal sectional view on the line $x\ x$ of Fig. 1; and Fig. 3, a detached view, representing a modified form of the device for closing the generating-chamber.

The letter A indicates a cylindrical or other suitably-shaped vessel, constructed of or lined with suitable material to withstand the action of acid. The said chamber is open at the top, as indicated.

The letter B indicates a cylindrical vessel, provided with an inverted conical bottom, and having legs C, by which it is supported within the vessel A. In the upper part of the chamber B, and passing through its top, is a chamber, D, which is frustum-shaped, and has a perforated bottom, E. The said chamber, at its top, is provided with a cover, F, which may be clamped tightly to its seat by means of the bolts and clamp-nuts G, in order to prevent the escape of gas. Surrounding that portion of the chamber D within the chamber B is a chamber, H, and above said chamber H, and communicating with it by a short pipe, K', is located a chamber, K. Within the said chamber K is a small chamber, L, from which extend a series of tapering tubes downward into the chamber H. The chambers K and D are connected by means of a short pipe, M, having an automatically-operating valve, N. The chambers D and L connect by means of a tube, P, having a valve, R.

The letter S indicates a tube leading downward from the upper part of the vessel A into the lower part of the vessel B, for the purpose hereinafter explained; and the letter T indicates a drain-pipe, which should be provided with a suitable valve or cock, whereby the waste may be drawn off from the chamber B. The letter U indicates a pipe extending from the top of the chamber H, which is provided with a screw-cap provided with a closed glass tube, W, into which extends the upper end of the float-rod X, by means of which the level of the liquid in the chamber K is indicated. The tube S is provided with a valve, V, which is operated by a valve-rod, Z, extending upward, as shown.

The operation of my invention is as follows: The chamber D is charged with scrap-iron or granulated zinc through the opening at the top, and the cover is then securely fastened. The chamber H is then charged with liquid hydrocarbon up to a proper level, as will be indicated by the float-rod in the glass tube before mentioned. A mixture of sulphuric acid and water is then poured into the vessel A until it reaches above the level of the tube S, when it will pass into the chamber B, and, rising, will come in contact with the iron scrap or zinc, generating hydrogen gas, which will pass into the small chamber L, before mentioned, and thence down into the carbureting-chamber H, through the tapering tubes above described. Here it will be carbureted, and from thence passed into the chamber above through the connecting-pipe K', and will then pass through a pipe, A', to the burners. The carbureting-chamber is filled through a tube, B', provided with a screw-cap, C', gradually raising the float until the proper level is indicated by the float-rod. It will be observed that the outer wall of the chamber is tapered toward the bottom to form a gas-space, to keep the water in the outer vessel, A, from striking said wall and condensing the vapor in the chamber.

Having thus described my invention, what I claim, and desire to secure by Letters Patent, is—

1. The combination, in a machine for generating and carbureting hydrogen gas, of an outer vessel adapted to contain acidulated water, an inner vessel communicating with said outer vessel by a suitable valved pipe, a frustum-shaped chamber having a perforated bottom and extending through the top of the inner vessel, and provided with a suitable top, a carbureting-chamber surrounding the lower part of the frustum-shaped chamber, the chamber communicating with the frustum-shaped chamber, the tapered pipes, and the upper chamber communicating with the frustum-shaped chamber by means of a valved pipe, the exit-pipe, and filling and discharge pipes, all arranged to operate substantially as specified.

2. The combination, with the frustum-shaped chamber, provided with a perforated bottom, and the inner chamber, within which it is located, of the surrounding chamber and connections for charging and conducting the gas to the carburetor.

In testimony whereof I affix my signature in presence of two witnesses.

WILLIAM COLLINGS.

Witnesses:
JENNIE PERKINS,
FLORA J. McCREERY.